US008098836B2

(12) United States Patent
Sakamoto et al.

(10) Patent No.: US 8,098,836 B2
(45) Date of Patent: Jan. 17, 2012

(54) ACTIVE VIBRATORY NOISE CONTROL APPARATUS

(75) Inventors: Kosuke Sakamoto, Utsunomiya (JP); Toshio Inoue, Tochigi-ken (JP); Akira Takahashi, Tochigi-ken (JP); Yasunori Kobayashi, Utsunomiya (JP); Kenji Yamagata, Kawagoe (JP); Shinji Fukumoto, Kawagoe (JP)

(73) Assignees: Honda Motor Co., Ltd., Tokyo (JP); Pioneer Corporation, Tokyo (JP)

( * ) Notice: Subject to any disclaimer, the term of this patent is extended or adjusted under 35 U.S.C. 154(b) by 1059 days.

(21) Appl. No.: 11/987,618

(22) Filed: Dec. 3, 2007

(65) Prior Publication Data

US 2008/0152158 A1 Jun. 26, 2008

(30) Foreign Application Priority Data

Dec. 26, 2006 (JP) ................................ 2006-349257

(51) Int. Cl.
*G10K 11/16* (2006.01)
*H04B 15/00* (2006.01)
*G10K 11/00* (2006.01)

(52) U.S. Cl. ................ 381/71.4; 381/71.11; 381/71.12; 381/86; 381/94.9

(58) Field of Classification Search ................ 381/71.4, 381/71.8, 71.11, 71.12, 71.1, 71.2, 86, 94.1, 381/94.9, 71.14, 123; 181/206
See application file for complete search history.

(56) References Cited

U.S. PATENT DOCUMENTS

| | | | | | |
|---|---|---|---|---|---|
| 5,488,667 | A * | 1/1996 | Tamamura et al. | .......... | 381/71.4 |
| 5,544,080 | A * | 8/1996 | Kobayashi et al. | .......... | 700/280 |
| 5,638,305 | A * | 6/1997 | Kobayashi et al. | .......... | 700/280 |
| 5,689,572 | A * | 11/1997 | Ohki et al. | .......... | 381/71.3 |
| 5,701,349 | A * | 12/1997 | Sano et al. | .......... | 381/71.4 |
| 6,418,228 | B1 * | 7/2002 | Terai et al. | .......... | 381/71.8 |
| 7,352,869 | B2 * | 4/2008 | Inoue et al. | .......... | 381/71.11 |
| 7,536,018 | B2 * | 5/2009 | Onishi et al. | .......... | 381/71.8 |
| 7,574,006 | B2 * | 8/2009 | Funayama et al. | .......... | 381/71.12 |
| 7,792,312 | B2 * | 9/2010 | Inoue et al. | .......... | 381/71.9 |
| 7,873,173 | B2 * | 1/2011 | Inoue et al. | .......... | 381/71.4 |
| 2008/0192948 | A1 * | 8/2008 | Kan et al. | .......... | 381/71.4 |
| 2008/0240456 | A1 * | 10/2008 | Sakamoto et al. | .......... | 381/71.4 |
| 2009/0279710 | A1 * | 11/2009 | Onishi et al. | .......... | 381/71.4 |
| 2010/0098265 | A1 * | 4/2010 | Pan et al. | .......... | 381/94.1 |

FOREIGN PATENT DOCUMENTS

| | | | | |
|---|---|---|---|---|
| JP | 05-173581 | A | | 7/1993 |
| JP | 06-118968 | A | | 4/1994 |
| JP | 06332477 | A | * | 12/1994 |
| JP | 2003-047097 | A | | 2/2003 |

* cited by examiner

*Primary Examiner* — Edgardo San Martin
(74) *Attorney, Agent, or Firm* — Arent Fox, LLP

(57) ABSTRACT

When the frequency of an engine rotation signal reaches a predetermined frequency, a comparator of a switching unit outputs a switching control signal to selectors and a filter coefficient updater. Based on the switching control signal, the selector switches from a connection between one memory and a corrector to a connection between another memory and the corrector, thereby changing the transfer characteristics C^rr of the corrector from C^11 to C^10. Based on the switching control signal, the selector switches from a connection between one ADC and a filter coefficient updater to the connection between another ADC and the filter coefficient updater, thereby supplying the filter coefficient updater with an error signal, rather than an error signal.

9 Claims, 8 Drawing Sheets

ACTIVE VIBRATORY NOISE CONTROL APPARATUS

CROSS REFERENCE TO RELATED APPLICATION

This application claims the priority of Japanese Application No. 2006-349257, filed Dec. 26, 2003 the entire specification, claims and drawings of which are incorporated herewith by reference.

BACKGROUND OF THE INVENTION

1. Field of the Invention

The present invention relates to an active vibratory noise control apparatus for canceling vibratory noises produced by a vibratory noise source by means of vibratory noise canceling sounds that are opposite in phase to the vibratory noise, and more particularly to an active vibratory noise control apparatus for reducing vibratory noises produced within a passenger compartment of a vehicle by a vibratory noise source such as the vehicle engine.

2. Description of the Related Art

Conventional active vibratory noise control apparatus operate by detecting noise in the passenger compartment of a vehicle by means of a microphone disposed centrally over the front seats near the position of an ear of a passenger, then generating a signal that is opposite in phase to an output signal produced by the microphone based on the noise, and outputting canceling sounds based on the generated signal into the passenger compartment from two speakers that are mounted respectively in the left and right doors alongside of the front seats, for thereby reducing the noise at the microphone (see Japanese Laid-Open Patent Publication No. 2003-47097).

As shown in FIG. 3 of the accompanying drawings, when the frequency of the sound heard by the ear of the passenger in the passenger compartment increases nearly to 140 Hz, for example, one-half of the wavelength of the canceling sound becomes nearly (L3-L4), representing the difference between a distance L3 from a speaker 28*b* on the right side (left side in FIG. 3) of the vehicle 12, as viewed from the passenger to an ear position 80 of the passenger, and a distance L4 from a speaker 28*a* on the left side (right side in FIG. 3) of the vehicle 12 as viewed from the passenger to the ear position 80. At the ear position 80, therefore, the canceling sounds from the speakers 28*a* and 28*b* interfere with each other.

According to Japanese Laid-Open Patent Publication No. 2003-47097, a phase shifter generates signals by shifting the central frequency of the phase rotation of the signal in an opposite phase, and supplies the generated signals to the respective speakers. In this manner, even when the frequency of the sound in the passenger compartment becomes higher, the canceling sounds from the left and right speakers are prevented from interfering with each other.

However, since the phase shifter is added to the apparatus for reducing noise in the passenger compartment, and the opposite phase signal is rotated in phase by means of the phase shifter, the active vibratory noise control apparatus has a complex configuration and is high in cost.

SUMMARY OF THE INVENTION

It is an object of the present invention to provide an active vibratory noise control apparatus, which has a simple arrangement that is capable of reducing vibratory noise, regardless of changes in frequency of the vibratory noise.

Another object of the present invention is to provide an active vibratory noise control apparatus, which is reduced in cost and is capable of reducing vibratory noise within a wide space.

According to the present invention, an active vibratory noise control apparatus basically comprises a reference wave signal generator for generating a reference wave signal having a frequency based on the frequency of vibratory noise generated by a vibratory noise source, an adaptive filter for outputting a control signal based on the reference wave signal in order to cancel the vibratory noise, vibratory noise canceller for outputting vibratory noise canceling sounds based on the control signal, error signal detector for outputting an error signal based on the difference between the vibratory noise and the vibratory noise canceling sounds, corrector for correcting the reference wave signal and outputting a corrected reference wave signal as a reference signal to the error signal detector, based on a corrective value corresponding to signal transfer characteristics from the vibratory noise canceller, and filter coefficient updater for sequentially updating a filter coefficient of the adaptive filter in order to minimize the error signal based on the error signal and the reference signal.

The vibratory noise canceller includes at least two first vibratory noise canceller disposed near a first space, and at least one second vibratory noise canceller disposed near a second space. The error signal detector includes either both at least one first error signal detector disposed near the first space, and at least one second error signal detector disposed near the second space, or only the first error signal detector.

The active vibratory noise control apparatus also includes a switcher for changing the corrective value of the corrector from a first corrective value corresponding to signal transfer characteristics from the first vibratory noise canceller to the first error signal detector, or from a second corrective value corresponding to signal transfer characteristics from the second vibratory noise canceller to the second error signal detector, to a third corrective value corresponding to signal transfer characteristics from the second vibratory noise canceller to the first error signal detector, and changing the vibratory noise canceller for outputting the vibratory noise canceling sounds into the first space from the first vibratory noise canceller to the second vibratory noise canceller, when control characteristics of the vibratory noise have changed across a preset threshold value.

With the above arrangement, in order to output the vibratory noise canceling sounds from the vibratory noise canceller, when the control characteristics of the vibratory noise have changed across the preset threshold value, the switcher changes the corrective value of the corrector, and also changes combinations of the vibratory noise canceller for outputting the vibratory noise canceling sounds and the error signal detector for outputting the error signal.

Therefore, if the vibratory noise canceling sounds output from two of the first vibratory noise canceller tend to interfere with each other when the frequency of the vibratory noise is equal to or higher than a predetermined frequency (e.g., 140 Hz), then the threshold value is set to the predetermined frequency. When the control characteristics of the vibratory noise change across the threshold value, the switcher changes the combinations of the vibratory noise canceller and the error signal detector so as to avoid interference between the vibratory noise canceling sounds. The vibratory noise can efficiently be reduced at a location spaced from the first error signal detector.

Since the vibratory noise canceling sounds output from the vibratory noise canceller are prevented from interfering with each other, without the need for the phase shifter disclosed in Japanese Laid-Open Patent Publication No. 2004-47097, vibratory noise can be reduced by a simpler arrangement, even when the frequency of the vibratory noise changes. Also, since a phase shifter is not used, the active vibratory noise control apparatus is relatively low in cost. Since canceling sounds are prevented from interfering with each other by changing combinations of the vibratory noise canceller and the error signal detector, vibratory noises can be reduced within a wider space.

Control characteristics of the vibratory noise are defined by characteristics relative to the vibratory noise to be reduced by the active vibratory noise control apparatus, and may be represented by the frequency of the vibratory noise, for example. The threshold value refers to a threshold value corresponding to the frequency of the vibratory noise, at which the vibratory noise canceling sounds interfere with each other when two of the first vibratory noise canceller output vibratory noise canceling sounds into the first space.

The first space refers to a space in which vibratory noise is reduced by the first vibratory noise canceller and the first error signal detector disposed near the first space when the control characteristics are lower than the threshold value, and wherein the vibratory noise is reduced by the second vibratory noise canceller disposed near the second space when the control characteristics are higher than the threshold value. The second space refers to a space in which vibratory noise is reduced by the second vibratory noise canceller disposed near the second space when the control characteristics are lower than the threshold value.

The switcher preferably should stop outputting vibratory noise canceling sounds from the first vibratory noise canceller when the control characteristics of the vibratory noise have changed across the preset threshold value. Therefore, the vibratory noise within the first space can reliably be reduced even if the control characteristics of the vibratory noise change.

Preferably, the switcher changes the corrective value of the corrector from the first corrective value to a fourth corrective value corresponding to signal transfer characteristics from the first vibratory noise canceller to the second error signal detector, and from the second corrective value to the third corrective value, changes the vibratory noise canceller for outputting the vibratory noise canceling sounds into the first space from the first vibratory noise canceller to the second vibratory noise canceller, and changes the vibratory noise canceller for outputting the vibratory noise canceling sounds into the second space from the second vibratory noise canceller to the first vibratory noise canceller, when the control characteristics of the vibratory noise have changed across the preset threshold value. Vibratory noises within the first and second spaces can thus reliably be reduced even if the control characteristics of the vibratory noise change.

Preferably, the switcher includes a control signal supply switcher for changing the vibratory noise canceller to be supplied with the control signal output from the adaptive filter, and an error signal switcher for changing the error signal detector for supplying the error signal to the filter coefficient updater, when the control characteristics of the vibratory noise have changed across the preset threshold value. Vibratory noise can thus be reduced efficiently.

Preferably, the vibratory noise source comprises an engine of a vehicle, and the control characteristics of the vibratory noise represent the frequency of the vibratory noise generated by the engine or by the rotational speed of an output shaft of the engine. If the first space is disposed around the front seats or the rear seat of the passenger compartment of the vehicle, then the vibratory noise in the passenger compartment can reliably be reduced.

Preferably, the vibratory noise source comprises a propeller shaft or tire wheels of the vehicle, and the control characteristics of the vibratory noise represent the rotational frequency of the propeller shaft or the tire wheels, or the speed of the vehicle. With this arrangement, vibratory noises within the passenger compartment can also reliably be reduced.

The switcher preferably comprises a corrected filter coefficient calculator for calculating a corrected filter coefficient by multiplying the filter coefficient by a predetermined value of less than 1, and a filter coefficient switcher for supplying the corrected filter coefficient, rather than the filter coefficient, to the adaptive filter when the control characteristics are higher than the threshold value. In order to change the vibratory noise canceller for outputting the vibratory noise canceling sounds at the time the control characteristics become higher than the threshold value, the vibratory noise canceller may be operated in a fade-out mode, for gradually reducing the vibratory noise canceling sounds rather than stopping output of the vibratory noise canceling sounds upon changing the vibratory noise canceller. Accordingly, an uncomfortable vibratory noise is prevented from being generated when the vibratory noise canceller are switched.

The switcher may impart hysteresis to the threshold value when the control characteristics are higher than the threshold value and lower than the threshold value, so that combinations can be changed efficiently even when the frequency of the vibratory noise varies near a frequency corresponding to the threshold value.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

FIGS. 1 through 4 show an active vibratory noise control apparatus (hereinafter referred to as "ANC") 10A according to a first embodiment of the present invention, which is applied to reduce vibratory noise within a passenger compartment (space) 14 of a vehicle 12.

Figure 1:
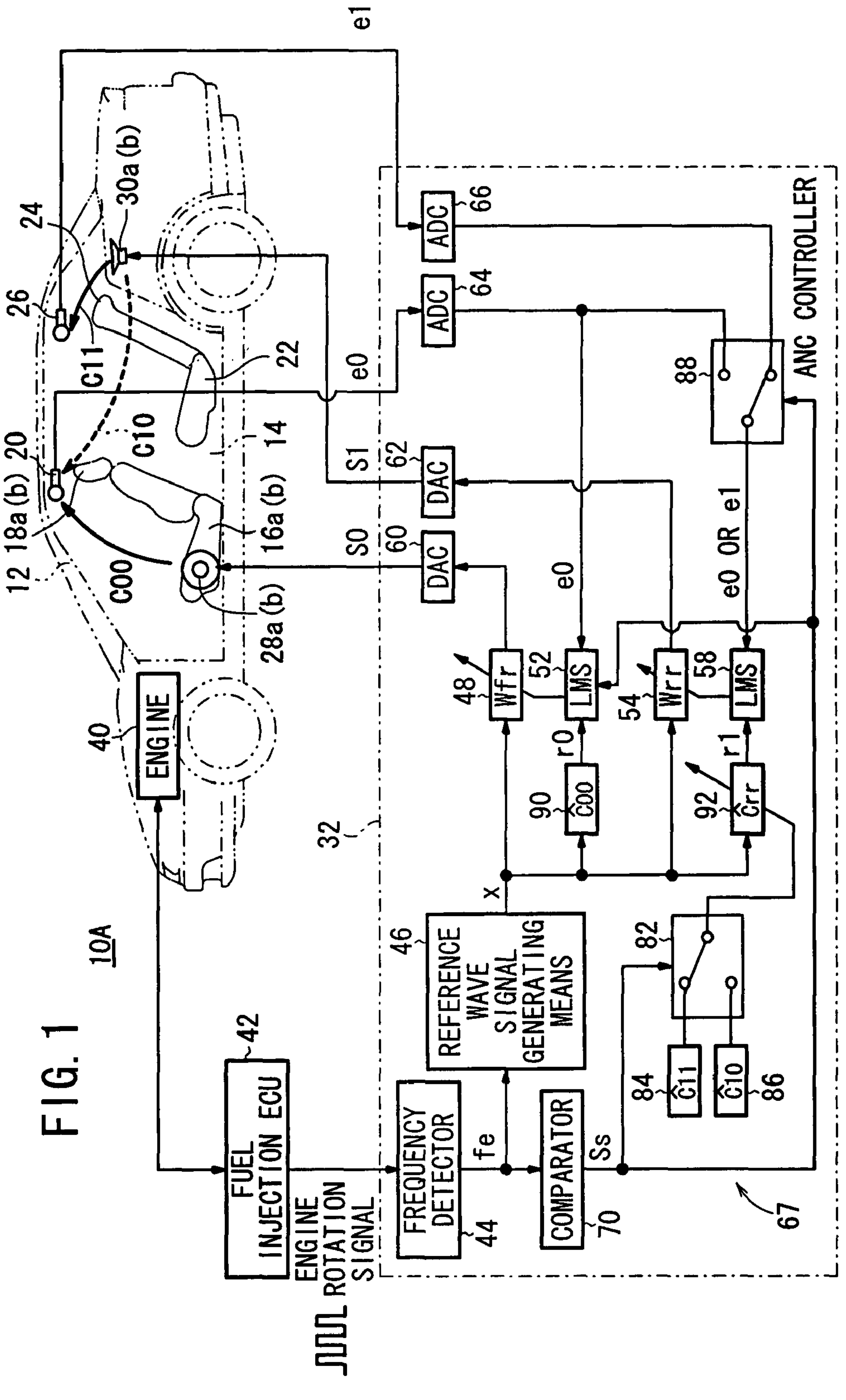
FIG. 1 is a block diagram of an active vibratory noise control apparatus according to a first embodiment of the present invention.
Figure 2:
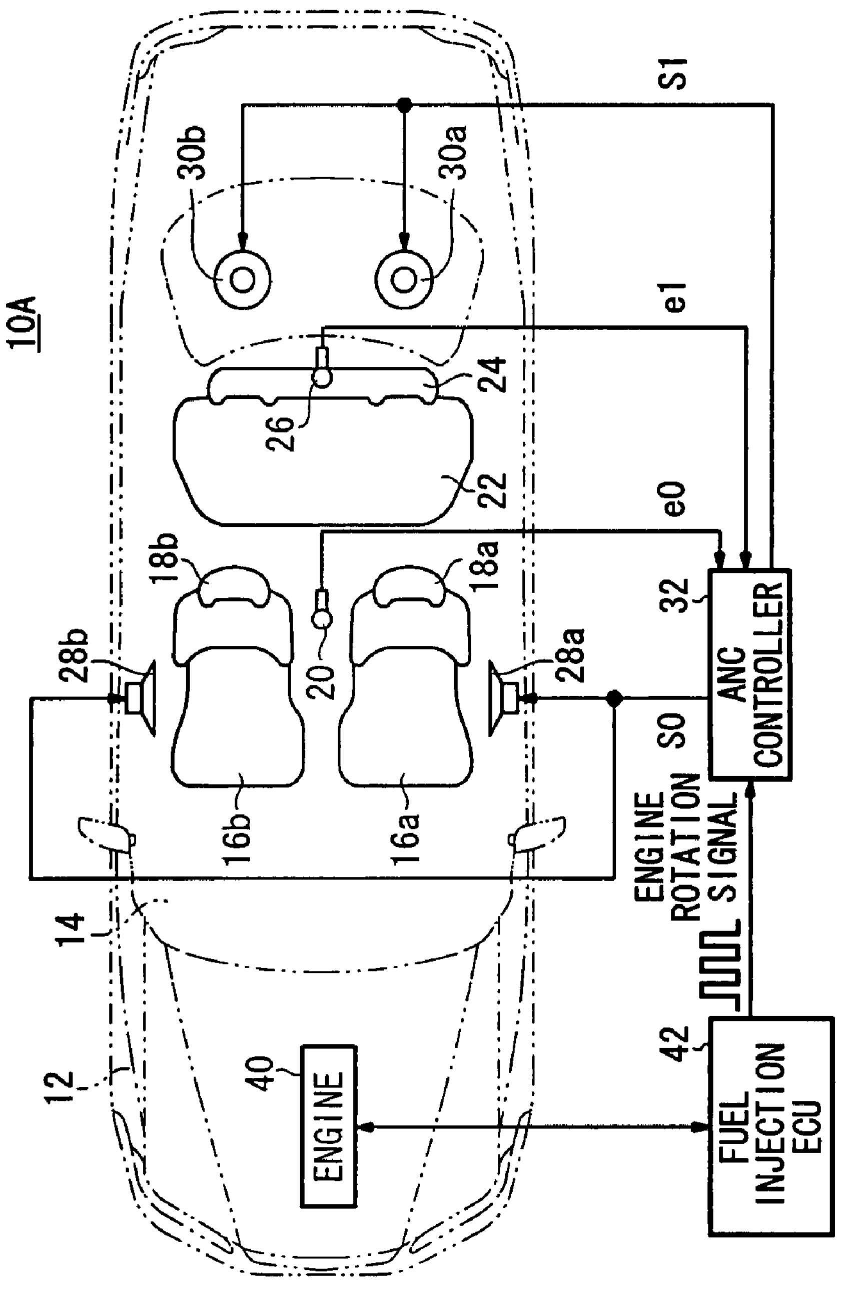
FIG. 2 is a plan view of a vehicle incorporating therein the active vibratory noise control apparatus shown in FIG. 1.
Figure 3:
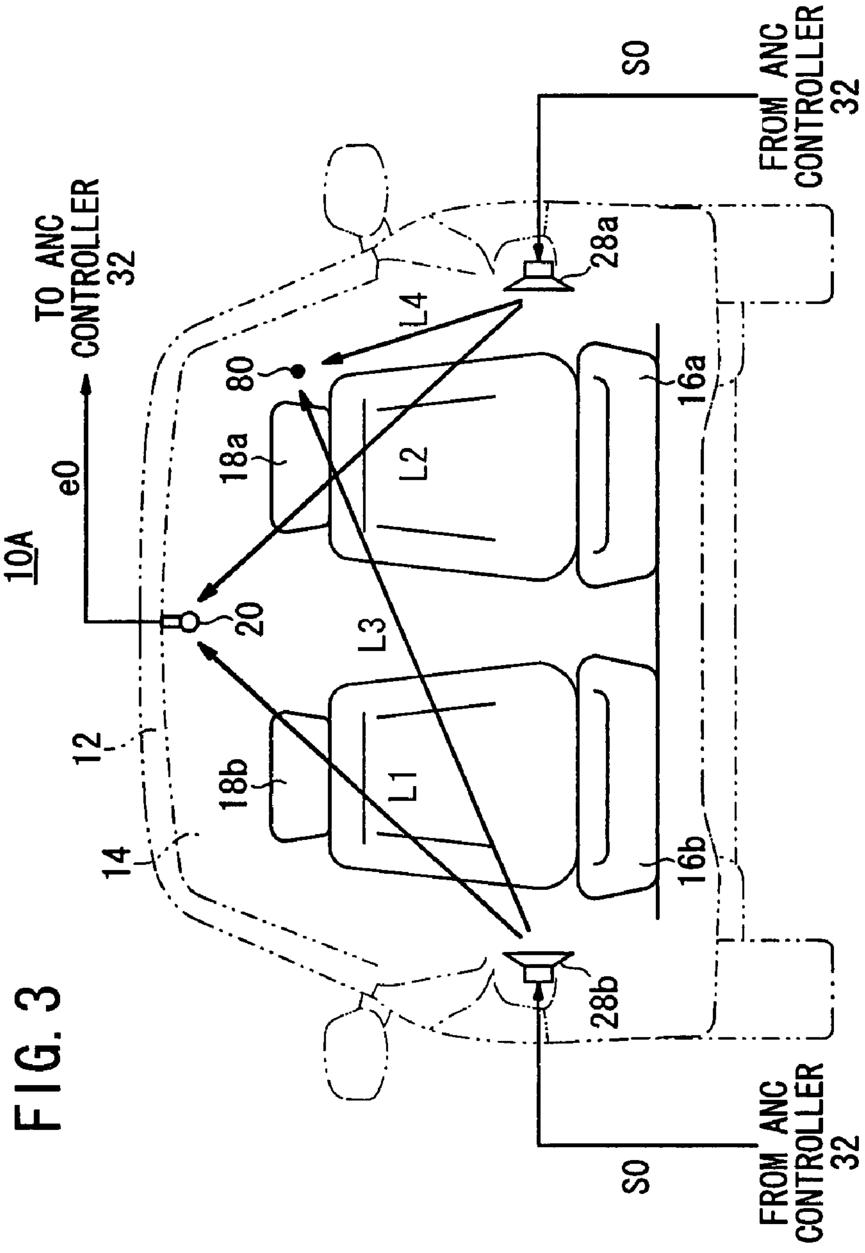
FIG. 3 is a front elevational view showing the layout of speakers and a microphone near front seats in the vehicle shown in FIG. 2.

As shown in FIGS. 1 through 3, the ANC 10A includes a microphone (first error signal detector) 20 disposed on a roof lining near headrests 18*a*, 18*b*, i.e., near to an ear of a passenger (not shown), centrally over the front seats 16*a*, 16*b* in the passenger compartment 14, and another microphone (second error signal detecting means, second error signal detector) 26 disposed on a roof lining near a headrest 24, centrally over a rear seat 22 inside the passenger compartment 14.

Figure 4:
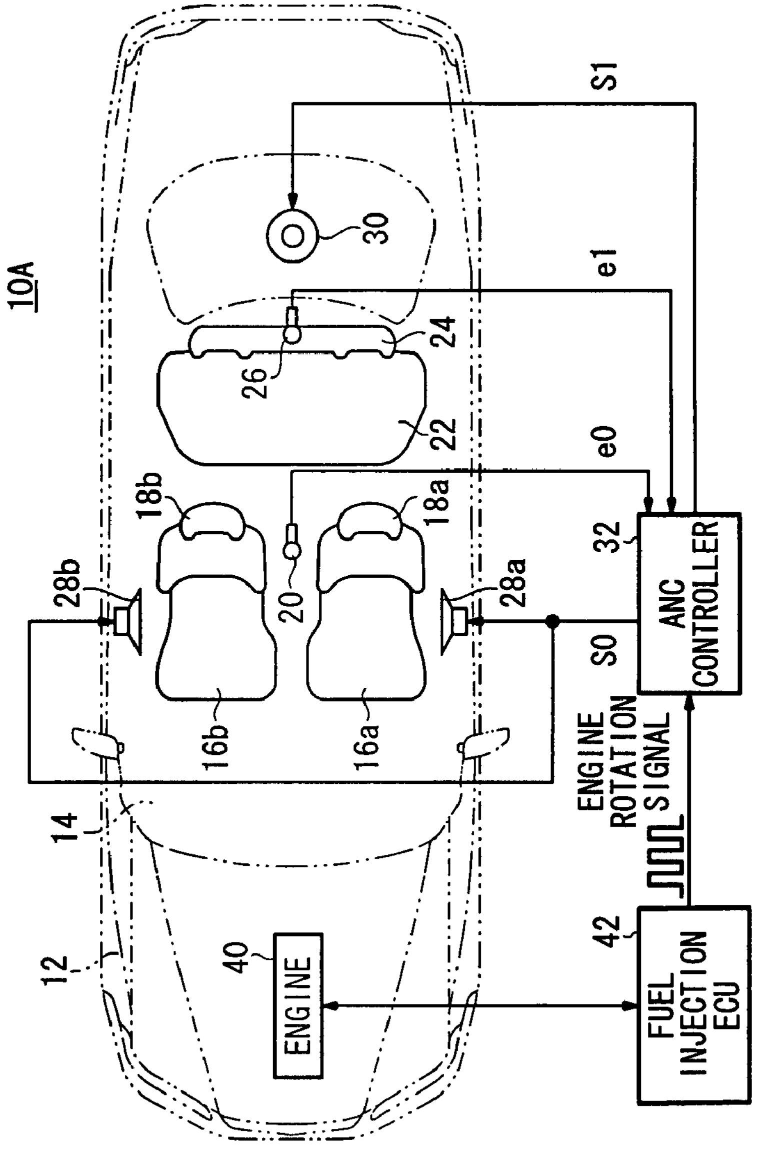
FIG. 4 is a plan view of a vehicle incorporating therein the active vibratory noise control apparatus, with a single speaker disposed behind a rear seat in the vehicle.

The ANC 10A also includes a speaker 28*a* mounted on a left door near to the front seats 16*a*, 16*b*, a speaker 28*b* mounted on a right door near to the front seats 16*a*, 16*b*, and two speakers 30*a*, 30*b* disposed behind the rear seat 22. Alternatively, as shown in FIG. 4, the ANC 10A may have a single speaker 30 disposed behind the rear seat 22, rather than the two speakers 30*a* and 30*b*. The speakers (vibratory noise canceller) 28*a*, 28*b*, 30, 30*a*, 30*b* shown in FIGS. 1 through 4 are provided as speakers of an audio system that is incorporated as standard equipment in the vehicle 12.

The ANC 10A also has an ANC controller 32 including a microcomputer. The ANC controller 32 basically comprises a frequency detector 44, a reference wave signal generating means (a reference wave signal generator) 46, a pair of adaptive filters 48, 54, a pair of filter coefficient updating means (filter coefficient updater) 52, 58, and a pair of correcting means (corrector) 90, 92.

The frequency detector 44 comprises a frequency counter for detecting the frequency fe of an engine rotation signal that is output from a fuel injection ECU 42 for controlling an engine 40 on the vehicle 12. The engine rotation signal is output from a Hall device or the like, not shown, per each revolution of the output shaft of the engine 40. The engine rotation signal is a signal that correlates with noise generated from the engine 40, e.g., engine sounds and periodic noise caused by vibrational forces produced upon rotation of the output shaft of the engine 40, and vibratory noise caused by vibrations of the engine 40.

The reference wave signal generating means 46 generates a reference wave signal x of predetermined harmonics with respect to a fundamental frequency, which is given as a frequency fe from the frequency detector 44.

The adaptive filter 48 generates a control signal S0 by multiplying the reference signal x by a filter coefficient Wfr, and the adaptive filter 54 generates a control signal S1 by multiplying the reference signal x by a filter coefficient Wrr. The control signals S0, S1 serve to cancel out vibratory noise (hereinafter referred to as "engine noise") that occurs in the passenger compartment 14 as a result of vibratory noise produced from the engine 40. The control signals S0, S1 are converted by DA converters (DACs) 60, 62 from digital signals into analog signals, which are output to the speakers 28*a*, 28*b*, 30, 30*a*, 30*b*.

The speakers 28*a*, 28*b*, 30, 30*a*, 30*b* output canceling sounds (vibratory noise canceling sounds) into the passenger compartment 14 for canceling engine noise based on the control signals S0, S1. The microphone 20 outputs the difference between the canceling sounds from the speakers (first vibratory noise canceling means, first vibratory noise canceller) 28*a*, 28*b* or the speakers (second vibratory noise canceling means, second vibratory noise canceller) 30, 30*a*, 30*b* and the engine sound as an error signal e0 to the ANC controller 32. The microphone 26 also outputs the difference between the canceling sounds from the speakers 30, 30*a*, 30*b* and the engine sound as an error signal e1 to the ANC controller 32.

The correcting means 90 generates a reference signal r0 by correcting the reference wave signal x with a corrective value, representing transfer characteristics C^00 (first corrective value) that is simulative of transfer characteristics (first transfer characteristics) C00 from the speakers 28*a*, 28*b* to the microphone 20, and outputs the reference signal r0 to the filter coefficient updating means 52. The correcting means 92 generates a reference signal r1 by correcting the reference wave signal x with a corrective value, representing predetermined transfer characteristics C^rr, and outputs the reference signal r1 to the filter coefficient updating means 58. The transfer characteristics C^00 are transfer characteristics from the input of the DAC 60 to the output of an AD converter (ADC) 64, including transfer characteristics C00, and the transfer characteristics C^rr are transfer characteristics C^11 (second corrective value) from the input of the DAC 62 to the output of an ADC 66, including transfer characteristics C11 from the speakers 30, 30*a*, 30*b* to the microphone 26, or transfer characteristics C^10 (third corrective value) from the input of the DAC 62 to the output of the ADC 64,including transfer characteristics C10 from the speakers 30,30*a*, 30*b* to the microphone 20.

Each of the filter coefficient updating means 52, 58 comprises a least-mean-square (LMS) algorithm processor. The filter coefficient updating means 52 performs an adaptive calculation process for the filter coefficient Wfr, based on the reference signal r0 and the error signal e0 that has been converted from an analog signal into a digital signal by the ADC 64, i.e., a calculation process for calculating the filter coefficient Wfr, so as to minimize the error signal e0 according to an LMS method and thereby update the filter coefficient Wfr. The filter coefficient updating means 58 performs an adaptive calculation process for the filter coefficient Wrr, based on the reference signal r1 and the error signal e0 that has been converted from an analog signal into a digital signal by the ADC 64 or the error signal e1 that has been converted from an analog signal into a digital signal by the ADC 66, i.e., a calculation process for calculating the filter coefficient Wrr, so as to minimize the error signal e0 or e1 according to an LMS method and thereby update the filter coefficient Wrr.

The ANC controller 32 includes a switching means (switcher) 67 for switching the transfer characteristics C^rr of the correcting means 92 to C^11 or C^10 depending on the frequency fe, and also for switching the error signal to be input to the filter coefficient updating means 58 to e0 or e1. The switching means 67 comprises a comparator 70, a memory 84 for storing the transfer characteristics C^11, a memory 86 for storing the transfer characteristics C^10, and selectors 82, 88.

The comparator 70 outputs a switching control signal Ss to the selectors 82, 88 and the filter coefficient updating means 52, when the frequency f3 reaches a predetermined frequency (threshold value). Based on the switching control signal Ss, the selector 82 selectively connects the memory 84 or the memory 86 to the correcting means 92 in order to set the transfer characteristics C^rr to C^11 or C^10. Based on the switching control signal Ss, the selector (error signal switcher) 88 selectively connects the ADC 64 or the ADC 66 to the filter coefficient updating means 58, so as to supply the error signal e0 or e1 to the filter coefficient updating means 58. The filter coefficient updating means 52 performs an adaptive calculation process for updating the filter coefficient to Wfr=0. The predetermined frequency referred to above is 140 Hz, for example.

The predetermined frequency of 140 Hz is employed for the following reasons: As shown in FIG. 3, the distance from the speaker 28*b* to the microphone 20 is represented by L1, the distance from the speaker 28*a* to the microphone 20 is represented by L2, the distance from the speaker 28*b* to the ear position 80 of the passenger near the left door (the right door as viewed in FIG. 3) is represented by L3, and the distance from the speaker 28*a* to the ear position 80 is represented by L4. When the frequency of the canceling sound increases to nearly 140 Hz, one-half of the wavelength of the canceling sound becomes nearly (L3-L4). As a result, the canceling sounds from the speakers 28*a*, 28*b* interfere with each other at the ear position 80. However, in the vicinity of the microphone 20, even when the frequency of the canceling sound reaches 140 Hz, the canceling sounds from the speakers 28*a*, 28*b* do not interfere with each other because L1=L2.

The ANC 10A according to the first embodiment is constructed as described above. Operations of the ANC 10A, including switching operations of the switching means 67, shall be described below with reference to FIGS. 1 through 4.

A mode of operation of the ANC 10A when the frequency fe is smaller than 140 Hz (fe<140 Hz) will first be described below.

The fuel injection ECU 42 outputs an engine rotation signal to the ANC controller 32, and the microphones 20, 26 output respective error signals e0, e1 to the ANC controller 32. The comparator 70 monitors whether the frequency fe has reached 140 Hz or not. If the comparator 70 judges that fe<140 Hz, then the comparator 70 does not output the switching control signal Ss to the selectors 82, 88 and the filter coefficient updating means 52. The selector 82 connects the memory 84 to the correcting means 92, and the selector 88 connects the ADC 66 to the filter coefficient updating means 58. As a result, the transfer characteristics C^rr of the correcting means 92 are set to C^11, and the error signal e1 is supplied to the filter coefficient updating means 58. The filter coefficient updating means 52 performs an adaptive calculation process for the filter coefficient Wfr based on the reference signal r0 and the error signal e0, thereby updating the filter coefficient Wfr. The filter coefficient updating means 58 performs an adaptive calculation process for the filter coefficient Wrr based on the reference signal r1 and the error signal e1, thereby updating the filter coefficient Wrr.

When fe<140 Hz, therefore, the adaptive filters 48, 54 output respective control signals S0, S1 through the DACs 60, 62 to the speakers 28*a*, 28*b*, 30, 30*a*, 30*b*. The speakers 28*a*, 28*b* output canceling sounds, based on the control signal S0, into a first space around the front seats 16*a*, 16*b* in the passenger compartment 14. The speakers 30, 30*a*, 30*b* output canceling sounds, based on the control signal S1, into a second space around the rear seats 22 inside the passenger compartment 14.

The microphone 20 generates the error signal e0, representing the difference between the canceling sounds from the speakers 28*a*, 28*b* and the engine noise, and the microphone 26 generates the error signal e1, representing the difference between the canceling sounds from the speakers 30, 30*a*, 30*b* and the engine noise.

When fe<140 Hz, the first space refers to a space in which engine noise is reduced by the speakers, serving as the first vibratory noise canceling means, and the microphone, serving as the first error signal detecting means disposed near the first space. When fe≧140 Hz, the first space refers to a space in which engine noise is reduced by the speakers, serving as the second vibratory noise canceling means disposed near the second space. When fe<140 Hz, the second space refers to a space in which engine noise is reduced by the speakers, serving as the second vibratory noise canceling means disposed near the second space.

A mode of operation of the ANC 10A when the frequency fe is equal to or larger than 140 Hz (fe≧140 Hz) will be described below.

When the frequency fe reaches 140 Hz, the comparator 70 outputs a switching control signal Ss to the selectors 82, 88 and the filter coefficient updating means 52. The selector 82 connects the memory 86 to the correcting means 92, thereby changing the transfer characteristics C^rr of the correcting means 92 from C^11 to C^10. The selector 88 connects the ADC 64 to the filter coefficient updating means 58, which is supplied with the error signal e0. The filter coefficient updating means 52 performs an adaptive calculation process for updating the filter coefficient Wfr of the adaptive filter 48 to Wfr=0.

When fe≧140 Hz, therefore, the ANC controller 32 outputs solely the control signal S1, which is generated by the adaptive filter 54. As a result, the microphone 20 generates an error signal e0 representing the difference between the canceling sounds from the speakers 30, 30*a*, 30*b* and the engine noise, while outputting an error signal e0 to the ANC controller 32.

With the ANC 10A according to the first embodiment, therefore, if the speakers 28*a*, 28*b*, 30, 30*a*, 30*b* output canceling sounds for canceling engine noise caused in the passenger compartment 14 as a result of vibratory noise produced by the engine 40, then in the switching means 67 when the comparator 70 detects that the frequency fe of the engine rotation signal representative of control characteristics of the vibratory noise has reached a predetermined threshold (near to 140 Hz), the comparator 70 outputs a switching control signal Ss to the selectors 82, 88 and the filter coefficient updating means 52. The transfer characteristics C^rr of the correcting means 92 are thus switched to C^11 or C^10 by the selector 82, and the combinations of the speakers 28*a*, 28*b*, 30, 30*a*, 30*b*, which output the canceling sounds, and the microphones 20, 26, which output the error signals e0, e1, are changed by operation of the selector 88 and the filter coefficient updating means 52.

When the frequency fe reaches 140 Hz, therefore, the combinations of the speakers 28*a*, 28*b*, 30, 30*a*, 30*b* and the microphones 20, 26 are changed with the switching means 67 in order to avoid interference between the canceling sounds in the passenger compartment 14. Engine noise can efficiently be reduced at the ear position 80, which is spaced from the microphone 20.

Since canceling sounds are prevented from interfering with each other, without the need for the phase shifter disclosed in Japanese Laid-Open Patent Publication No. 2003-47097, engine noise inside the passenger compartment 14 can be reduced by means of a simpler arrangement according to the first embodiment, even when the frequency fe changes. Further, since a phase shifter is not used, the ANC 10A is relatively low in cost. Since canceling sounds are prevented from interfering with each other, as a result of changing the combinations of the speakers 28*a*, 28*b*, 30, 30*a*, 30*b* and the microphones 20, 26, engine noise can be reduced within a wider space.

When the frequency fe reaches 140 Hz, the comparator 70 outputs a switching control signal Ss to the selectors 82, 88 and the filter coefficient updating means 52. Consequently, engine noise in the passenger compartment 14 can reliably be reduced near the front seats 16*a*, 16*b* (within the first space), even when the frequency fe changes.

Furthermore, when the selector 88 is supplied with the switching control signal Ss, since the selector 88 of the switching means 67 switches the error signal that is supplied to the filter coefficient updating means 52 to e0 or e1, engine noise inside the passenger compartment 14 can be reduced efficiently.

Figure 5:
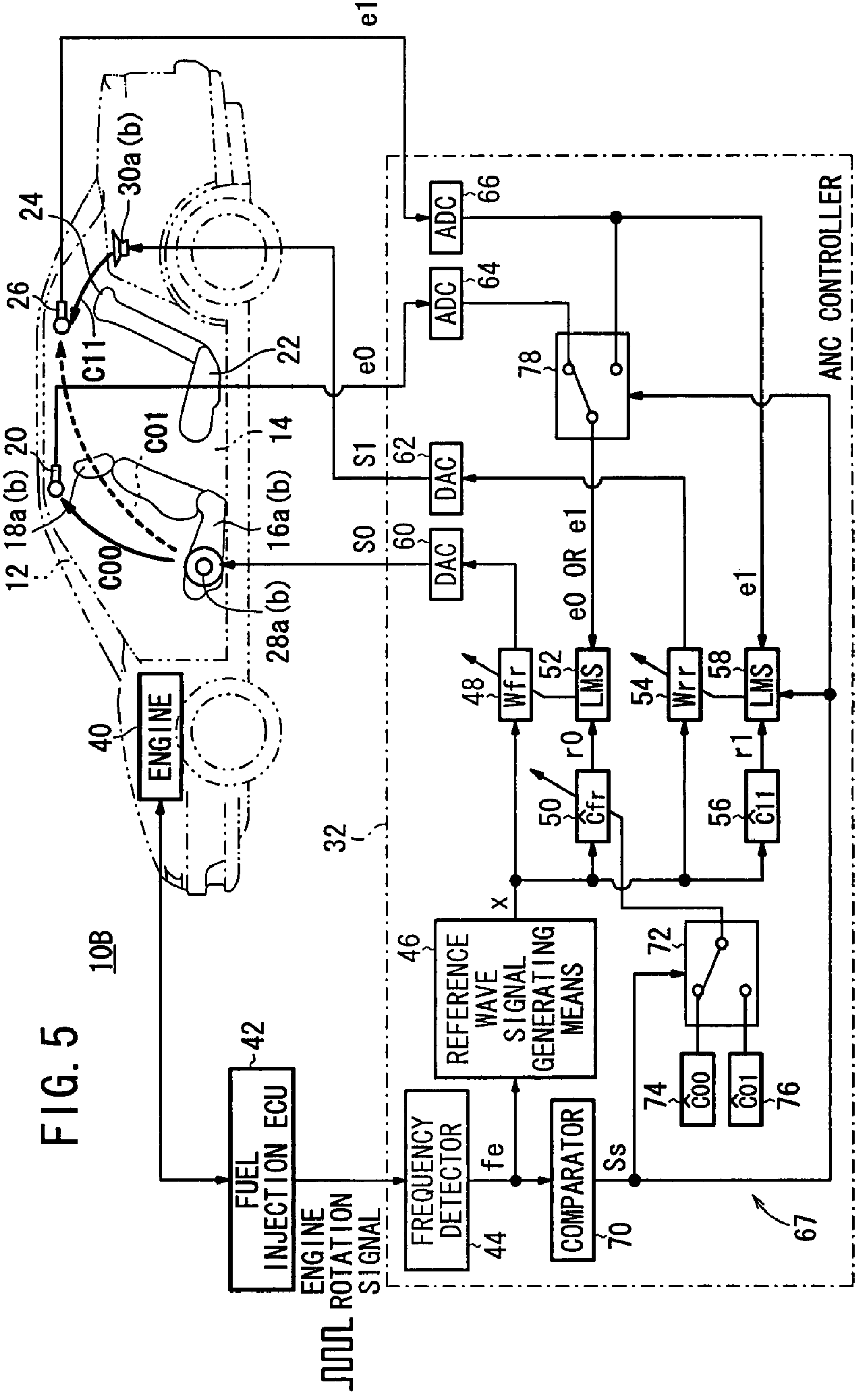
FIG. 5 is a block diagram of an active vibratory noise control apparatus according to a second embodiment of the present invention.

An ANC 10B according to a second embodiment of the present invention will be described below with reference to FIG. 5. Parts of the ANC 10B that are identical to those of the ANC 10A according to the first embodiment (see FIGS. 1 through 4) shall be denoted using identical reference characters, and will not be described in detail below.

The ANC 10B differs from the ANC 10A according to the first embodiment (see FIG. 1) in that a correcting means 50 has transfer characteristics C^fr, and a correcting means 56 has transfer characteristics C^11 (first corrective value). The comparator 70 can supply the switching control signal Ss to selectors 72, 78 and the filter coefficient updating means 58. The selector 72 connects a memory 74 or a memory 76 to the correcting means 50 in response to the switching control signal Ss, and the selector 78 connects the ADC 64 or the ADC 66 to the filter coefficient updating means 52 in response to the switching control signal Ss. The ANC 10B also differs from the ANC 10A in that the first space is defined as a space near the rear seat 22 within the passenger compartment 14, whereas the second space is defined as a space near the front seats 16*a*, 16*b* within the passenger compartment 14.

The ANC 10B operates as follows: When the frequency fe reaches 140 Hz, the comparator 70 outputs a switching control signal Ss to the selectors 72, 78 and the filter coefficient updating means 58.

The selector 72 switches from a connection between the memory 74 for storing the transfer characteristics C^00 (second corrective value) and the correcting means 50, to a connection between the memory 76 for storing transfer characteristics C^01 (third corrective value) from the input of the DAC 60 to the output of the ADC 66, including transfer characteristics C01 from the speakers 28*a*, 28*b* to the microphone 26 and the correcting means 50. Thus, the selector 72 changes the transfer characteristics C^fr of the correcting means 50 from C^00 to C^01. The selector 78 switches from a connection between the ADC 64 and the filter coefficient updating means 52, to a connection between the ADC 66 and the filter coefficient updating means 52, so that the error signal e1 can be supplied to the filter coefficient updating means 52.

When fe<140 Hz, the microphone 20 generates an error signal e0 representing the difference between the canceling sounds from the speakers 28*a*, 28*b* and the engine noise, while the microphone 26 generates an error signal e1 representing the difference between the canceling sounds from the speakers 30*a*, 30*b* and the engine noise. When fe≧140 Hz, the ANC controller 32 outputs only the control signal S0 generated by the adaptive filter 48. As a result, the microphone 26 generates an error signal e1 representing the difference between the canceling sounds from the speakers 28*a*, 28*b* and the engine noise, and also outputs the error signal e1 to the ANC controller 32.

The ANC 10B according to the second embodiment offers the same advantages as those of the switching means 67 of the ANC 10A (see FIG. 1) according to the first embodiment. In addition, when the frequency fe reaches 140 Hz, since the switching control signal Ss is output to the selectors 72, 78 and the filter coefficient updating means 58, engine noise within the first space, near the rear seat 22 inside the passenger compartment 14, can reliably be reduced even when the frequency fe changes.

Figure 6:
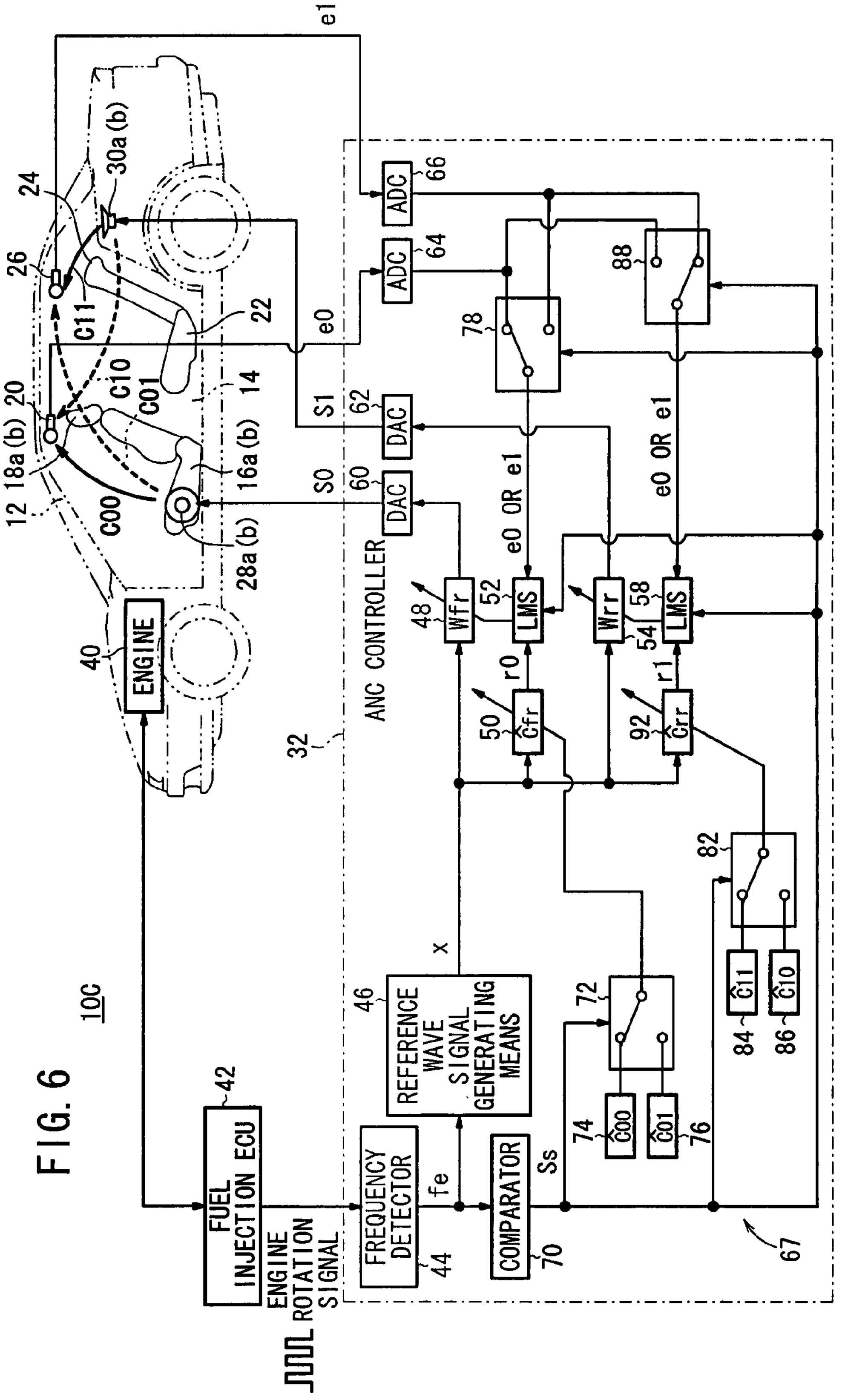
FIG. 6 is a block diagram of an active vibratory noise control apparatus according to a third embodiment of the present invention.

An ANC 10C according to a third embodiment of the present invention will be described below with reference to FIG. 6.

The ANC 10C is different from the ANCs 10A, 10B according to the first and second embodiments (see FIGS. 1 through 5) in that when the frequency fe reaches 140 Hz, the comparator 70 outputs a switching control signal Ss to the selectors 72, 78, 82, 88 and the filter coefficient updating means 52, 58.

The ANC 10C according to the third embodiment offers the same advantages as those of the switching means 67 of the ANCs 10A, 10B according to the first and second embodiments. In particular, the ANC 10C can reliably reduce engine noise within both the first and second spaces, near the front seats 16*a*, 16*b* and the rear seat 22 inside the passenger compartment 14, even when the frequency fe changes.

Figure 7:
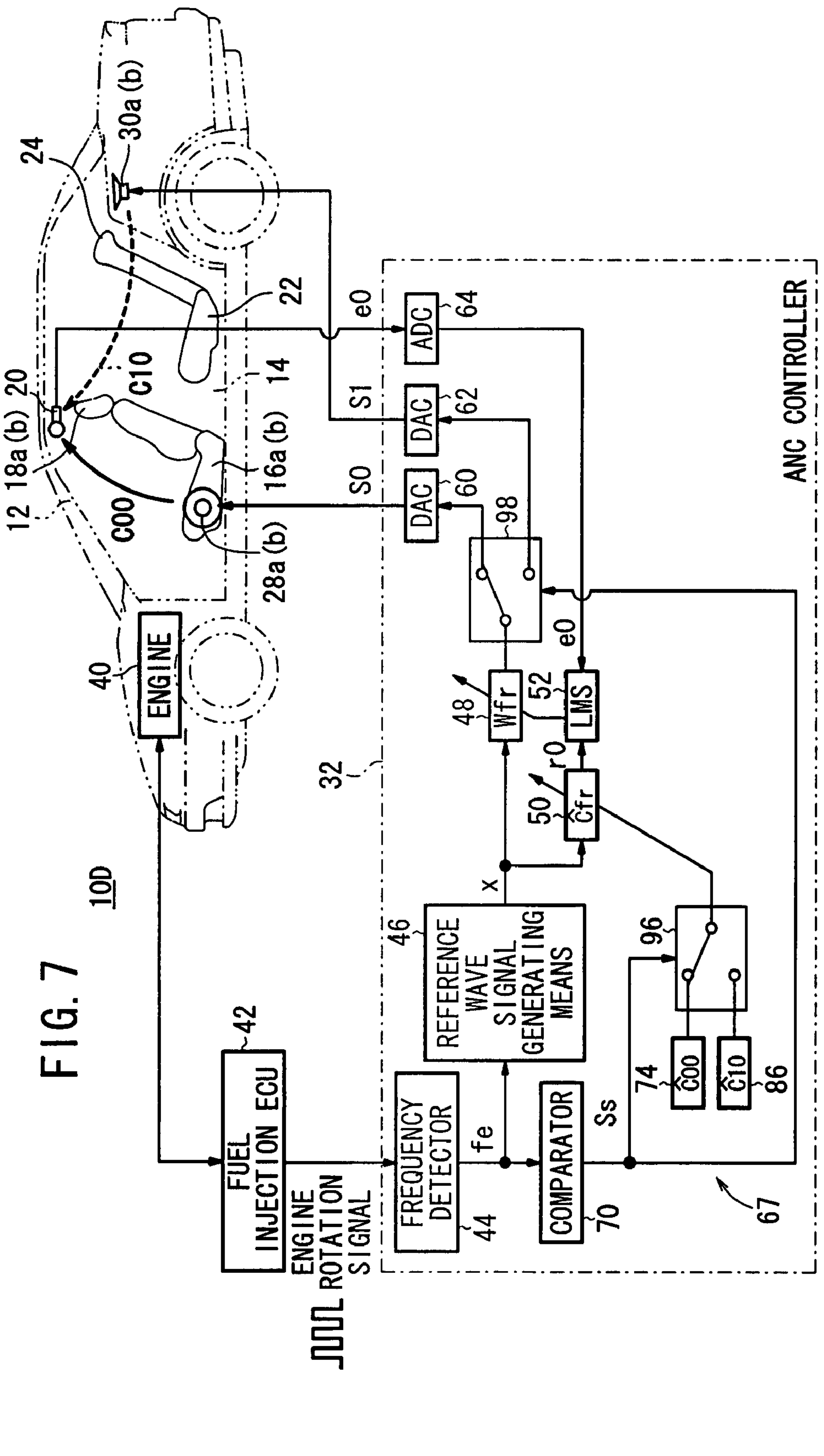
FIG. 7 is a block diagram of an active vibratory noise control apparatus according to a fourth embodiment of the present invention.

An ANC 10D according to a fourth embodiment of the present invention will be described below with reference to FIG. 7.

The ANC 10D differs from the ANC 10B according to the second embodiment (see FIG. 5) in that only one microphone, i.e., the microphone 20, is disposed in the passenger compartment 14. Further, a selector 96 connects the memory 74 or the memory 86 to the correcting means 50 in response to the switching control signal Ss, and a selector (control signal supply switcher) 98 connects the DAC 60 or the DAC 62 to the adaptive filter 48 in response to the switching control signal Ss. The ANC controller 32 is free of the adaptive filter 54, the correcting means 56, the filter coefficient updating means 58, the selector 78, and the ADC 66. The ANC 10D also differs from the ANC 10B in that the first space is defined as a space near the front seats 16*a*, 16*b* within the passenger compartment 14, whereas the second space is defined as a space near the rear seat 22 within the passenger compartment 14.

The ANC 10D operates as follows: When the frequency fe reaches 140 Hz, the comparator 70 outputs a switching control signal Ss to the selectors 96, 98. The selector 96 switches from a connection between the memory 74 and the correcting means 50, to a connection between the memory 86 and the correcting means 50, thereby changing the transfer characteristics C^fr of the correcting means 50 from C^00 (first corrective value) to C^10 (third corrective value). The selector 98 switches from a connection between the DAC 60 and the adaptive filter 48, to a connection between the DAC 62 and the adaptive filter 48. As a result, the filter coefficient updating means 52 updates the filter coefficient Wfr based on the transfer characteristics C^10, and the adaptive filter 48 outputs a generated control signal, as a control signal S1, through the selector 98 and the DAC 62 to the speakers 30*a*, 30*b*.

When fe<140 Hz, the microphone 20 generates an error signal e0, representing the difference between the canceling sounds from the speakers 28*a*, 28*b* and the engine noise. When fe≧140 Hz, the microphone 20 generates an error signal e0, representing the difference between the canceling sounds from the speakers 30*a*, 30*b* and the engine noise.

The ANC 10D according to the fourth embodiment offers the same advantages as those of the switching means 67 of the ANC 10B (see FIG. 5) according to the second embodiment. In addition, even though only one microphone, i.e., the microphone 20, is disposed inside the passenger compartment 14, engine noise near the front seats 16*a*, 16*b* within the passenger compartment 14 (first space) can reliably be reduced, regardless of changes in the frequency fe of the engine rotation signal. Engine noise can efficiently be reduced by supplying control signals S0, S1 from the adaptive filter 48 desirably to the speakers 28*a*, 28*b*, 30*a*, 30*b*, depending on changes in the frequency fe.

Figure 8:
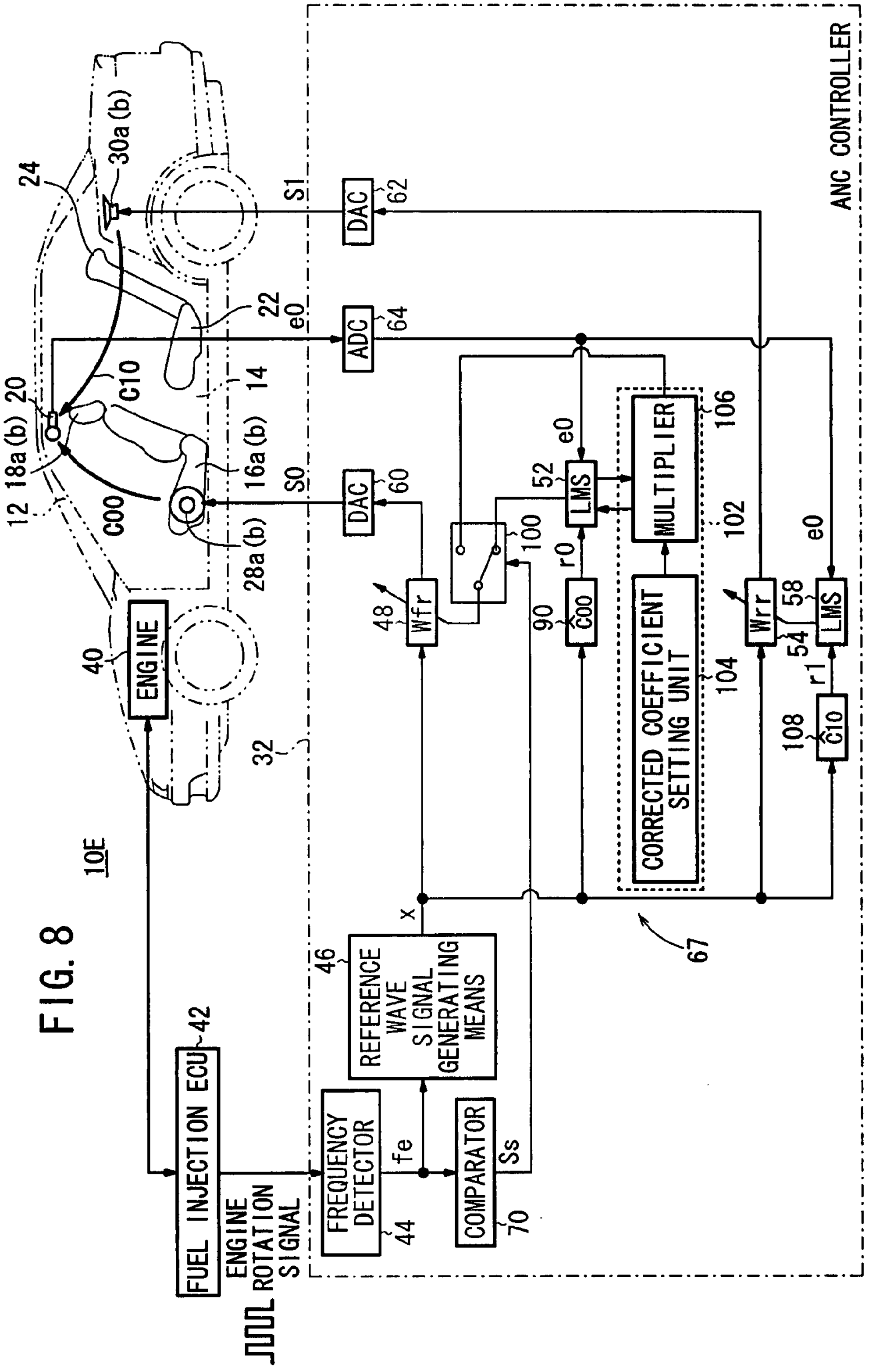
FIG. 8 is a block diagram of an active vibratory noise control apparatus according to a fifth embodiment of the present invention.

An ANC 10E according to a fifth embodiment of the present invention will be described below with reference to FIG. 8.

The ANC 10E differs from the ANCs 10A through 10D according to the first through fourth embodiments (see FIGS. 1 through 7) in that the switching means 67 includes the comparator 70, a selector (filter coefficient switcher) 100, and a corrected filter coefficient calculating means (corrected filter coefficient calculator) 102. In addition, correcting means 90, 108 include transfer characteristics, which are set respectively to C^00 (first corrective value) and C^10 (third corrective value).

The corrected filter coefficient calculating means 102 comprises a corrected coefficient setting unit 104, in which a predetermined value of less than 1 is preset, and a multiplier 106 for multiplying the filter coefficient Wfr adaptively calculated by the filter coefficient updating means 52 by the predetermined value, so as to sequentially calculate a corrected filter coefficient. As with the ANCs 10A, 10D (see FIGS. 1 through 4, 7), the first space is defined as a space near the front seats 16*a*, 16*b* within the passenger compartment 14, whereas the second space is defined as a space near the rear seat 22 within the passenger compartment 14.

When the frequency fe reaches 140 Hz, the comparator 70 outputs the switching control signal Ss to the selector 100.

The selector 100 then switches from a connection between the filter coefficient updating means 52 and the adaptive filter 48, to a connection between the multiplier 106 and the adaptive filter 48. As a result, the corrected filter coefficient calculated by the multiplier 106 is sequentially updated as the filter coefficient Wfr of the adaptive filter 48.

When fe<140 Hz, the microphone 20 generates an error signal e0 representing the difference between the canceling sounds from the speakers 28*a*, 28*b*, 30*a*, 30*b* and the engine noise, and then outputs the error signal e0 to the ANC controller 32. When fe≧140 Hz, the selector 100 and the corrected filter coefficient calculating means 102 update the filter coefficient Wfr, such that the value thereof is sequentially reduced. Therefore, canceling sounds output from the speakers 28*a*, 28*b* are sequentially reduced, until the canceling sounds output from the speakers 28*a*, 28*b* ultimately are eliminated.

The ANC 10E according to the fifth embodiment is thus capable of operating in a fade-out mode for gradually reducing the canceling sounds, rather than stopping output of the canceling sounds from the speakers 28*a*, 28*b*, upon switching of the connection when the frequency fe reaches 140 Hz. Accordingly, an uncomfortable vibratory noise is prevented from occurring when the speakers are switched.

The above fade-out mode of operation may also be applied to the ANCs 10A through 10D, according to the first through fourth embodiments (see FIGS. 1 through 7).

In the first through fifth embodiments, engine noise inside the passenger compartment 14 is reduced using the frequency fe of the engine rotation signal. However, the transfer characteristics may also be switched based on the rotational speed of the output shaft of the engine 40.

The vibratory noise source may be a propeller shaft or tire wheels of the vehicle 12, whereby the transfer characteristics are switched based on the rotational frequency of the propeller shaft or the tire wheels, or based on the speed of the vehicle 12, in order to reduce noise from the propeller shaft or the tire wheels.

The switching means 67 may be arranged to impart hysteresis to the threshold value of the comparator 70 when the frequency fe is higher than 140 Hz and lower than 140 Hz, so that the transfer characteristics can be switched efficiently even when the frequency fe varies near 140 Hz.

Although certain preferred embodiments of the present invention have been shown and described in detail, it should be understood that various changes and modifications may be made to the embodiment without departing from the scope of the invention as set forth appended claims.

What is claimed is:

1. An active vibratory noise control apparatus comprising:

reference wave signal generator for generating a reference wave signal having a frequency based on the frequency of vibratory noise generated by a vibratory noise source;

an adaptive filter for outputting a control signal based on said reference wave signal in order to cancel said vibratory noise;

vibratory noise canceller for outputting vibratory noise canceling sounds based on said control signal;

error signal detector for outputting an error signal based on the difference between said vibratory noise and said vibratory noise canceling sounds;

corrector for correcting said reference wave signal and outputting a corrected reference wave signal as a reference signal, based on a corrective value corresponding to signal transfer characteristics from said vibratory noise canceller to said error signal detector; and filter coefficient updater for sequentially updating a filter coefficient of said adaptive filter in order to minimize said error signal based on said error signal and said reference signal, wherein said vibratory noise canceller includes at least two first vibratory noise canceller disposed near a first space, and at least one second vibratory noise canceller disposed near a second space, and wherein said error signal detector includes either both at least one first error signal detector disposed near said first space, and at least one second error signal detector disposed near said second space, or only said first error signal detector; and switcher for changing the corrective value of said corrector from a first corrective value corresponding to signal transfer characteristics from said first vibratory noise canceller to said first error signal detector, or from a second corrective value corresponding to signal transfer characteristics from said second vibratory noise canceller to said second error signal detector, to a third corrective value corresponding to signal transfer characteristics from said second vibratory noise canceller to said first error signal detector, and changing the vibratory noise canceller for outputting said vibratory noise canceling sounds into said first space from said first vibratory noise canceller to said second vibratory noise canceller, when control characteristics of said vibratory noise have changed across a preset threshold value.

2. An active vibratory noise control apparatus according to claim 1, wherein said switcher stops outputting said vibratory noise canceling sounds from said first vibratory noise canceller when the control characteristics of said vibratory noise have changed across said preset threshold value.

3. An active vibratory noise control apparatus according to claim 1, wherein said switcher changes the corrective value of said corrector from said first corrective value to a fourth corrective value corresponding to signal transfer characteristics from said first vibratory noise canceller to said second error signal detector, and from said second corrective value to said third corrective value, changes the vibratory noise canceller for outputting said vibratory noise canceling sounds into said first space from said first vibratory noise canceller to said second vibratory noise canceller, and changes the vibratory noise canceller for outputting said vibratory noise canceling sounds into said second space from said second vibratory noise canceller to said first vibratory noise canceller, when the control characteristics of said vibratory noise have changed across said preset threshold value.

4. An active vibratory noise control apparatus according to claim 1, wherein said switcher includes a control signal supply switcher for changing said vibratory noise canceller to be supplied with said control signal output from said adaptive filter when the control characteristics of said vibratory noise have changed across said preset threshold value.

5. An active vibratory noise control apparatus according to claim 1, wherein said switcher includes an error signal switcher for changing said error signal detector for supplying said error signal to said filter coefficient updater, when the control characteristics of said vibratory noise have changed across said preset threshold value.

6. An active vibratory noise control apparatus according to claim 1, wherein said vibratory noise source comprises an engine of a vehicle, and said control characteristics of said vibratory noise represent the frequency of the vibratory noise generated by said engine or the rotational speed of an output shaft of said engine.

7. An active vibratory noise control apparatus according to claim 6, wherein said vehicle comprises a passenger compartment including front seats and a rear seat disposed therein, and wherein if said first space is disposed around said front seats, said second space is disposed around said rear seat, and if said first space is disposed around said rear seat, said second space is disposed around said front seats.

8. An active vibratory noise control apparatus according to claim 1, wherein said switcher comprises a comparator, memories for storing said corrective value, and selectors for changing connections between said memories and said corrector;

said comparator outputs a switching control signal to said selectors when the frequency based on the frequency of vibratory noise generated by said vibratory noise source reaches a predetermined frequency; and said selectors change connections between said memories and said corrector based on said switching signal so as to set said corrective value stored in said memories in said corrector.

9. An active vibratory noise control apparatus according to claim 1, wherein said switcher comprises a comparator, corrected filter coefficient calculator, and a filter coefficient switcher for changing connections between said adaptive filter and said filter coefficient updater, or said adaptive filter and said corrected filter coefficient calculator;

said corrected filter coefficient calculator sequentially calculates a corrected filter coefficient by multiplying said filter coefficient, as sequentially updated by said filter coefficient updater, by a predetermined value of less than 1;

said comparator outputs a switching control signal to said filter coefficient switcher when the frequency based on the frequency of vibratory noise generated by said vibratory noise source reaches a predetermined frequency; and based on said switching control signal, said filter coefficient switcher switches from a connection between said filter coefficient updater and said adaptive filter to a connection between said corrected filter coefficient calculator and said adaptive filter, and supplies said corrected filter coefficient to said adaptive filter, rather than said filter coefficient from said filter coefficient updater.

* * * * *